(12) United States Patent
Popovich et al.

(10) Patent No.: US 8,120,596 B2
(45) Date of Patent: Feb. 21, 2012

(54) TILED TOUCH SYSTEM

(75) Inventors: David Gregory Popovich, Ottawa (CA);
Douglas Blair Hill, Calgary (CA);
Serguei Vdovine, Calgary (CA)

(73) Assignee: SMART Technologies ULC, Calgary, Alberta (CA)

( * ) Notice: Subject to any disclaimer, the term of this patent is extended or adjusted under 35 U.S.C. 154(b) by 378 days.

(21) Appl. No.: 10/850,431

(22) Filed: May 21, 2004

(65) Prior Publication Data

US 2005/0259084 A1 Nov. 24, 2005

(51) Int. Cl.
*G06F 3/041* (2006.01)

(52) U.S. Cl. ........................... 345/178; 345/158

(58) Field of Classification Search .................. 345/1.1, 345/173, 156–158, 178, 1.3
See application file for complete search history.

(56) References Cited

U.S. PATENT DOCUMENTS

| | | |
|---|---|---|
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,613,066 A | 10/1971 | Cooreman |
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,879 A | 1/1981 | Carroll et al. |
| 4,247,767 A | 1/1981 | O'Brien et al. |
| 4,420,261 A | 12/1983 | Barlow et al. |
| 4,459,476 A | 7/1984 | Weissmueller et al. |
| 4,468,694 A | 8/1984 | Edgar |
| 4,507,557 A | 3/1985 | Tsikos |
| 4,550,250 A | 10/1985 | Mueller et al. |
| 4,553,842 A | 11/1985 | Griffin |
| 4,558,313 A | 12/1985 | Garwin |
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,737,631 A | 4/1988 | Sasaki |
| 4,742,221 A | 5/1988 | Sasaki et al. |
| 4,746,770 A | 5/1988 | McAvinney |
| 4,762,990 A | 8/1988 | Caswell et al. |

(Continued)

FOREIGN PATENT DOCUMENTS

AU 2003233728 A1 12/2003

(Continued)

OTHER PUBLICATIONS

International Search Report with a date of mailing of Oct. 22, 2001 for PCT/CA 01/00980 with an International Filing Date of Jul. 5, 2001.

(Continued)

*Primary Examiner* — Yong H Sim (74) *Attorney, Agent, or Firm* — Katten Muchin Rosenman LLP (57) ABSTRACT

A tiled touch system comprises a display on which a computer-generated image is presented. The image is formed of an array of image segments. A digitizer is mapped to the display and senses pointer contacts made thereon.

49 Claims, 8 Drawing Sheets

U.S. PATENT DOCUMENTS

| | | | |
|---|---|---|---|
| 4,766,424 A | 8/1988 | Adler et al. | |
| 4,782,328 A | 11/1988 | Denlinger | |
| 4,811,004 A | 3/1989 | Person et al. | |
| 4,818,826 A | 4/1989 | Kimura | |
| 4,820,050 A | 4/1989 | Griffin | |
| 4,822,145 A | 4/1989 | Staelin | |
| 4,831,455 A | 5/1989 | Ishikawa | |
| 4,851,664 A | 7/1989 | Rieger | |
| 4,868,551 A | 9/1989 | Arditty et al. | |
| 4,868,912 A | 9/1989 | Doering | |
| 4,888,479 A | 12/1989 | Tamaru | |
| 4,893,120 A | 1/1990 | Doering et al. | |
| 4,916,308 A | 4/1990 | Meadows | |
| 4,928,094 A | 5/1990 | Smith | |
| 4,943,806 A | 7/1990 | Masters et al. | |
| 4,980,547 A | 12/1990 | Griffin | |
| 4,990,901 A | 2/1991 | Beiswenger | |
| 5,025,314 A | 6/1991 | Tang et al. | |
| 5,025,411 A | 6/1991 | Tallman et al. | |
| 5,097,516 A | 3/1992 | Amir | |
| 5,103,085 A | 4/1992 | Zimmerman | |
| 5,105,186 A | 4/1992 | May | |
| 5,109,435 A | 4/1992 | Lo et al. | |
| 5,130,794 A | 7/1992 | Ritcher | |
| 5,140,647 A | 8/1992 | Ise et al. | |
| 5,148,015 A | 9/1992 | Dolan | |
| 5,162,618 A | 11/1992 | Knowles | |
| 5,162,783 A | 11/1992 | Moreno | |
| 5,164,714 A | 11/1992 | Wehrer | |
| 5,168,531 A | 12/1992 | Sigel | |
| 5,177,328 A * | 1/1993 | Ito et al. | 178/18.03 |
| 5,179,369 A | 1/1993 | Person et al. | |
| 5,196,835 A | 3/1993 | Blue et al. | |
| 5,196,836 A | 3/1993 | Williams | |
| 5,239,152 A | 8/1993 | Caldwell et al. | |
| 5,239,373 A | 8/1993 | Tang et al. | |
| 5,272,470 A | 12/1993 | Zetts | |
| 5,317,140 A | 5/1994 | Dunthorn | |
| 5,359,155 A | 10/1994 | Helser | |
| 5,374,971 A | 12/1994 | Clapp et al. | |
| 5,414,413 A | 5/1995 | Tamaru et al. | |
| 5,422,494 A | 6/1995 | West et al. | |
| 5,448,263 A | 9/1995 | Martin | |
| 5,457,289 A | 10/1995 | Huang et al. | |
| 5,483,261 A | 1/1996 | Yasutake | |
| 5,483,603 A | 1/1996 | Luke et al. | |
| 5,484,966 A | 1/1996 | Segen | |
| 5,490,655 A | 2/1996 | Bates | |
| 5,502,568 A | 3/1996 | Ogawa et al. | |
| 5,525,764 A | 6/1996 | Junkins et al. | |
| 5,528,263 A | 6/1996 | Platzker et al. | |
| 5,528,290 A | 6/1996 | Saund | |
| 5,537,107 A | 7/1996 | Funado | |
| 5,554,828 A | 9/1996 | Primm | |
| 5,581,276 A | 12/1996 | Cipolla et al. | |
| 5,581,637 A | 12/1996 | Cass et al. | |
| 5,591,945 A | 1/1997 | Kent | |
| 5,594,469 A | 1/1997 | Freeman et al. | |
| 5,594,502 A | 1/1997 | Bito et al. | |
| 5,617,312 A | 4/1997 | Iura et al. | |
| 5,638,092 A | 6/1997 | Eng et al. | |
| 5,670,755 A | 9/1997 | Kwon | |
| 5,686,942 A | 11/1997 | Ball | |
| 5,698,845 A | 12/1997 | Kodama et al. | |
| 5,729,704 A | 3/1998 | Stone et al. | |
| 5,734,375 A | 3/1998 | Knox et al. | |
| 5,736,686 A | 4/1998 | Perret, Jr. et al. | |
| 5,737,740 A | 4/1998 | Henderson et al. | |
| 5,739,479 A | 4/1998 | Davis-Cannon | |
| 5,745,116 A | 4/1998 | Pisutha-Arnond | |
| 5,764,223 A | 6/1998 | Chang et al. | |
| 5,771,039 A | 6/1998 | Ditzik | |
| 5,784,054 A | 7/1998 | Armstrong et al. | |
| 5,785,439 A | 7/1998 | Bowen | |
| 5,786,810 A | 7/1998 | Knox et al. | |
| 5,790,910 A | 8/1998 | Haskin | |
| 5,801,704 A | 9/1998 | Oohara et al. | |
| 5,804,773 A | 9/1998 | Wilson et al. | |
| 5,818,421 A | 10/1998 | Ogino et al. | |
| 5,818,424 A | 10/1998 | Korth | |
| 5,819,201 A * | 10/1998 | DeGraaf | 701/208 |
| 5,825,352 A | 10/1998 | Bisset et al. | |
| 5,831,602 A * | 11/1998 | Sato et al. | 345/175 |
| 5,909,210 A | 6/1999 | Knox et al. | |
| 5,911,004 A | 6/1999 | Ohuchi et al. | |
| 5,914,709 A | 6/1999 | Graham et al. | |
| 5,920,342 A | 7/1999 | Umeda et al. | |
| 5,936,615 A | 8/1999 | Waters | |
| 5,940,065 A | 8/1999 | Babb et al. | |
| 5,943,783 A | 8/1999 | Jackson | |
| 5,963,199 A | 10/1999 | Kato et al. | |
| 5,982,352 A | 11/1999 | Pryor | |
| 5,988,645 A | 11/1999 | Downing | |
| 5,990,874 A | 11/1999 | Tsumura | |
| 6,002,808 A | 12/1999 | Freeman | |
| 6,008,798 A | 12/1999 | Mato, Jr. et al. | |
| 6,031,531 A | 2/2000 | Kimble | |
| 6,061,177 A | 5/2000 | Fujimoto | |
| 6,075,905 A | 6/2000 | Herman et al. | |
| 6,076,041 A | 6/2000 | Watanabe | |
| 6,091,406 A | 7/2000 | Kambara et al. | |
| 6,100,538 A | 8/2000 | Ogawa | |
| 6,104,387 A | 8/2000 | Chery et al. | |
| 6,118,433 A * | 9/2000 | Jenkin et al. | 345/173 |
| 6,122,865 A | 9/2000 | Branc et al. | |
| 6,128,003 A | 10/2000 | Smith et al. | |
| 6,141,000 A | 10/2000 | Martin | |
| 6,147,678 A | 11/2000 | Kumar et al. | |
| 6,153,836 A | 11/2000 | Goszyk | |
| 6,161,066 A | 12/2000 | Wright et al. | |
| 6,179,426 B1 | 1/2001 | Rodriguez, Jr. et al. | |
| 6,188,388 B1 | 2/2001 | Arita et al. | |
| 6,191,773 B1 | 2/2001 | Maruno et al. | |
| 6,208,329 B1 | 3/2001 | Ballare | |
| 6,208,330 B1 | 3/2001 | Hasegawa et al. | |
| 6,209,266 B1 | 4/2001 | Branc et al. | |
| 6,215,477 B1 | 4/2001 | Morrison et al. | |
| 6,222,175 B1 | 4/2001 | Krymski | |
| 6,226,035 B1 | 5/2001 | Korein et al. | |
| 6,229,529 B1 | 5/2001 | Yano et al. | |
| 6,252,989 B1 | 6/2001 | Geisler et al. | |
| 6,256,033 B1 | 7/2001 | Nguyen | |
| 6,262,718 B1 | 7/2001 | Findlay et al. | |
| 6,310,610 B1 | 10/2001 | Beaton et al. | |
| 6,320,597 B1 | 11/2001 | Ieperen | |
| 6,323,846 B1 | 11/2001 | Westerman | |
| 6,326,954 B1 | 12/2001 | Van Ieperen | |
| 6,328,270 B1 | 12/2001 | Elberbaum | |
| 6,335,724 B1 | 1/2002 | Takekawa et al. | |
| 6,337,681 B1 | 1/2002 | Martin | |
| 6,339,748 B1 | 1/2002 | Hiramatsu | |
| 6,346,966 B1 | 2/2002 | Toh | |
| 6,352,351 B1 | 3/2002 | Ogasahara et al. | |
| 6,353,434 B1 | 3/2002 | Akebi | |
| 6,359,612 B1 | 3/2002 | Peter et al. | |
| 6,362,468 B1 | 3/2002 | Murakami et al. | |
| 6,377,228 B1 | 4/2002 | Jenkin et al. | |
| 6,384,743 B1 | 5/2002 | Vanderheiden | |
| 6,414,671 B1 | 7/2002 | Gillespie et al. | |
| 6,414,673 B1 | 7/2002 | Wood et al. | |
| 6,421,042 B1 | 7/2002 | Omura et al. | |
| 6,427,389 B1 | 8/2002 | Branc et al. | |
| 6,429,856 B1 | 8/2002 | Omura et al. | |
| 6,429,857 B1 | 8/2002 | Masters et al. | |
| 6,480,187 B1 | 11/2002 | Sano et al. | |
| 6,496,122 B2 | 12/2002 | Sampsell | |
| 6,497,608 B2 | 12/2002 | Ho et al. | |
| 6,498,602 B1 | 12/2002 | Ogawa | |
| 6,504,532 B1 | 1/2003 | Ogasahara et al. | |
| 6,507,339 B1 | 1/2003 | Tanaka | |
| 6,512,838 B1 | 1/2003 | Rafii et al. | |
| 6,517,266 B2 | 2/2003 | Saund | |
| 6,518,600 B1 | 2/2003 | Shaddock | |
| 6,522,830 B2 | 2/2003 | Yamagami | |
| 6,529,189 B1 | 3/2003 | Colgan et al. | |
| 6,530,664 B2 | 3/2003 | Vanderwerf et al. | |
| 6,531,999 B1 | 3/2003 | Trajkovic | |

| | | |
|---|---|---|
| 6,532,006 B1 | 3/2003 | Takekawa et al. |
| 6,540,366 B2 | 4/2003 | Keenan et al. |
| 6,540,679 B2 | 4/2003 | Slayton et al. |
| 6,545,669 B1 * | 4/2003 | Kinawi et al. .................. 345/173 |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,774,889 B1 | 8/2004 | Zhang et al. |
| 6,803,906 B1 | 10/2004 | Morrison et al. |
| 6,828,959 B2 | 12/2004 | Takekawa et al. |
| 6,864,882 B2 | 3/2005 | Newton |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,753 B1 | 12/2005 | Kimura et al. |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,868 B2 | 8/2006 | Farag et al. |
| 7,098,392 B2 | 8/2006 | Sitrick et al. |
| 7,121,470 B2 | 10/2006 | McCall et al. |
| 7,151,533 B2 | 12/2006 | Van Iperen |
| 7,176,904 B2 | 2/2007 | Satoh |
| 7,184,030 B2 | 2/2007 | McCharles et al. |
| 7,187,489 B2 | 3/2007 | Miles |
| 7,190,496 B2 | 3/2007 | Klug et al. |
| 7,202,860 B2 * | 4/2007 | Ogawa .................. 345/175 |
| 7,227,526 B2 | 6/2007 | Hildreth et al. |
| 7,232,986 B2 | 6/2007 | Worthington et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,479,949 B2 | 1/2009 | Jobs et al. |
| 7,492,357 B2 | 2/2009 | Morrison et al. |
| 7,499,037 B2 | 3/2009 | Lube |
| 7,538,759 B2 | 5/2009 | Newton |
| 7,559,664 B1 | 7/2009 | Walleman et al. |
| 7,619,617 B2 | 11/2009 | Morrison et al. |
| 7,692,625 B2 | 4/2010 | Morrison et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildrerth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 * | 4/2005 | Homer et al. .................. 345/173 |
| 2005/0104860 A1 | 5/2005 | McCreary et al. |
| 2005/0128190 A1 | 6/2005 | Ryynanen |

| Publication No. | Date | Inventor |
|---|---|---|
| 2005/0151733 A1 | 7/2005 | Sander et al. |
| 2005/0156900 A1 | 7/2005 | Hill et al. |
| 2005/0190162 A1 | 9/2005 | Newton |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0034486 A1 | 2/2006 | Morrison et al. |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0227120 A1 | 10/2006 | Eikman |
| 2006/0244734 A1 | 11/2006 | Hill et al. |
| 2006/0274067 A1 | 12/2006 | Hidai |
| 2006/0279558 A1 | 12/2006 | Van Delden et al. |
| 2007/0002028 A1 | 1/2007 | Morrison et al. |
| 2007/0019103 A1 | 1/2007 | Lieberman et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0139932 A1 | 6/2007 | Sun et al. |
| 2007/0152984 A1 | 7/2007 | Ording et al. |
| 2007/0152986 A1 | 7/2007 | Ogawa et al. |
| 2007/0165007 A1 | 7/2007 | Morrison et al. |
| 2007/0167709 A1 | 7/2007 | Slayton et al. |
| 2007/0205994 A1 | 9/2007 | van Ieperen |
| 2007/0236454 A1 | 10/2007 | Ung et al. |
| 2007/0273842 A1 | 11/2007 | Morrison |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0259050 A1 | 10/2008 | Lin et al. |
| 2008/0259052 A1 | 10/2008 | Lin et al. |
| 2009/0058832 A1 | 3/2009 | Newton |
| 2009/0058833 A1 | 3/2009 | Newton |
| 2009/0146972 A1 | 6/2009 | Morrison et al. |

FOREIGN PATENT DOCUMENTS

| | | |
|---|---|---|
| AU | 2006243730 A1 | 11/2006 |
| CA | 2058219 A1 | 4/1993 |
| CA | 2367864 A1 | 4/1993 |
| CA | 2219886 A1 | 4/1999 |
| CA | 2251221 A1 | 4/1999 |
| CA | 2267733 A1 | 10/1999 |
| CA | 2268208 A1 | 10/1999 |
| CA | 2252302 A1 | 4/2000 |
| CA | 2350152 A1 | 6/2001 |
| CA | 2412878 A1 | 1/2002 |
| CA | 2341918 A1 | 9/2002 |
| CA | 2386094 A1 | 12/2002 |
| CA | 2372868 A1 | 8/2003 |
| CA | 2390503 A1 | 12/2003 |
| CA | 2390506 A1 | 12/2003 |
| CA | 2432770 A1 | 12/2003 |
| CA | 2493236 A1 | 12/2003 |
| CA | 2448603 A1 | 5/2004 |
| CA | 2453873 A1 | 7/2004 |
| CA | 2460449 A1 | 9/2004 |
| CA | 2521418 A1 | 10/2004 |
| CA | 2481396 A1 | 3/2005 |
| CA | 2491582 A1 | 7/2005 |
| CA | 2563566 A1 | 11/2005 |
| CA | 2564262 A1 | 11/2005 |
| CA | 2501214 A1 | 9/2006 |
| CA | 2606863 A1 | 11/2006 |
| CA | 2580046 A1 | 9/2007 |
| CN | 1310126 C | 8/2001 |
| CN | 1784649 A | 6/2006 |
| CN | 101019096 A | 8/2007 |
| CN | 101023582 A | 8/2007 |
| CN | 1440539 A | 9/2009 |
| DE | 3836429 | 5/1990 |
| DE | 198 10 452 A1 | 12/1998 |
| DE | 60124549 | 9/2007 |
| EP | 125068 A2 | 11/1984 |
| EP | 0279652 A | 8/1988 |
| EP | 0347725 A2 | 12/1989 |
| EP | 420335 | 4/1991 |
| EP | 0 657 841 A1 | 6/1995 |
| EP | 0762319 A2 | 3/1997 |
| EP | 0829798 A2 | 3/1998 |
| EP | 897161 A1 | 2/1999 |
| EP | 911721 A2 | 4/1999 |
| EP | 1059605 A2 | 12/2000 |
| EP | 1262909 A2 | 12/2002 |
| EP | 1739528 A1 | 1/2003 |
| EP | 1739529 A1 | 1/2003 |
| EP | 1420335 A2 | 5/2004 |
| EP | 1 450 243 A2 | 8/2004 |
| EP | 1457870 A2 | 9/2004 |
| EP | 1471459 A2 | 10/2004 |
| EP | 1517228 A2 | 3/2005 |
| EP | 1550940 A2 | 6/2005 |
| EP | 1611503 A | 1/2006 |
| EP | 1674977 A | 6/2006 |
| EP | 1 297 488 B1 | 11/2006 |
| EP | 1741186 A | 1/2007 |
| EP | 1766501 A | 3/2007 |
| EP | 1830248 A1 | 9/2007 |
| EP | 1877893 A | 1/2008 |
| ES | 2279823 T3 | 9/2007 |
| GB | 1575420 | 9/1980 |
| GB | 2176282 A | 5/1986 |
| GB | 2204126 A | 11/1988 |
| GB | 2263765 A | 8/1993 |
| JP | 57-211637 A | 12/1982 |
| JP | 61-196317 A | 8/1986 |
| JP | 61-260322 A | 11/1986 |
| JP | 62-005428 | 1/1987 |
| JP | 63-223819 | 9/1988 |
| JP | 3-054618 A | 3/1991 |
| JP | 3244017 | 10/1991 |
| JP | 4-350715 A | 12/1992 |
| JP | 4-355815 A | 12/1992 |
| JP | 5-181605 A | 7/1993 |
| JP | 5-189137 A | 7/1993 |
| JP | 5-197810 A | 8/1993 |
| JP | 6-110608 | 4/1994 |
| JP | 7-110733 A | 4/1995 |
| JP | 7-230352 A | 8/1995 |
| JP | 8-016931 B2 | 2/1996 |
| JP | 8-108689 A | 4/1996 |
| JP | 8-240407 A | 9/1996 |
| JP | 8-315152 A | 11/1996 |
| JP | 9-091094 A | 4/1997 |
| JP | 9-224111 A | 8/1997 |
| JP | 9-319501 A | 12/1997 |
| JP | 10-105324 A | 4/1998 |
| JP | 11-051644 A | 2/1999 |
| JP | 11-064026 A | 3/1999 |
| JP | 11-085376 A | 3/1999 |
| JP | 11-110116 A | 4/1999 |
| JP | 11-203042 | 7/1999 |
| JP | 11-212692 | 8/1999 |
| JP | 2000-105671 A | 4/2000 |
| JP | 2000-132340 A | 5/2000 |
| JP | 2001-075735 A | 3/2001 |
| JP | 2001-142642 | 5/2001 |
| JP | 2001-282457 A | 10/2001 |
| JP | 2001282456 A | 10/2001 |
| JP | 2002-055770 | 2/2002 |

| | | | |
|---|---|---|---|
| JP | 2002-236547 A | 8/2002 | |
| JP | 2003-65716 A | 3/2003 | |
| JP | 2003-158597 A | 5/2003 | |
| JP | 2003167669 A | 6/2003 | |
| JP | 2003173237 A | 6/2003 | |
| JP | 2005-108211 A | 4/2005 | |
| JP | 2005-182423 A | 7/2005 | |
| JP | 2005-202950 A | 7/2005 | |
| WO | 98/07112 A2 | 2/1998 | |
| WO | 99/08897 A1 | 2/1999 | |
| WO | 9921122 A1 | 4/1999 | |
| WO | 99/28812 A1 | 6/1999 | |
| WO | 99/40562 A1 | 8/1999 | |
| WO | 01/24157 A1 | 4/2001 | |
| WO | 01/31570 A2 | 5/2001 | |
| WO | 01/63550 A2 | 8/2001 | |
| WO | 01/91043 A2 | 11/2001 | |
| WO | 02/03316 A1 | 1/2002 | |
| WO | 02/07073 A2 | 1/2002 | |
| WO | 02/27461 A1 | 4/2002 | |
| WO | 03/104887 A2 | 12/2003 | |
| WO | 03/105074 A2 | 12/2003 | |
| WO | 2004/072843 A1 | 8/2004 | |
| WO | 2004/090706 A2 | 10/2004 | |
| WO | 2004/102523 A1 | 11/2004 | |
| WO | 2004/104810 A1 | 12/2004 | |
| WO | 2005/031554 A1 | 4/2005 | |
| WO | 2005034027 A1 | 4/2005 | |
| WO | 2005/106775 A1 | 11/2005 | |
| WO | 2005/107072 A1 | 11/2005 | |
| WO | 2006/002544 A1 | 1/2006 | |
| WO | 2006/092058 A1 | 9/2006 | |
| WO | 2006/095320 A2 | 9/2006 | |
| WO | 2006/096962 A1 | 9/2006 | |
| WO | 2006/116869 A1 | 11/2006 | |
| WO | 2007/003196 A2 | 1/2007 | |
| WO | 2007/019600 A1 | 2/2007 | |
| WO | 2007/037809 | 4/2007 | |
| WO | 2007/064804 A1 | 6/2007 | |
| WO | 2007/079590 | 7/2007 | |
| WO | 2007/132033 A1 | 11/2007 | |
| WO | 2007/134456 A1 | 11/2007 | |
| WO | 2008/128096 A2 | 10/2008 | |
| WO | 2009/029764 A1 | 3/2009 | |
| WO | 2009/029767 A1 | 3/2009 | |
| WO | 2009/146544 A1 | 12/2009 | |
| WO | 2010/051633 A1 | 5/2010 | |

OTHER PUBLICATIONS

Bud K. Funk, CCDs in optical panels deliver high resolution, Electronic Design, Sep. 27, 1980, pp. 139-143.

Partial European Search Report with a search completion date of May 19, 2006 for European Patent Application EP 0 325 7166 filed Nov. 13, 2003.

Wolfgang Förstner, "On Estimating Rotations", Festschrift für Prof. Dr.-Ing. Heinrich Ebner zum 60. Geburtstag, Herausg.: C. Heipke und H. Mayer, Lehrstuhl für Photogrammetrie und Fernerkundung, Tu München, 1999, 12 pages. (http://www.ipb.uni-bonn.de/papers/#1999).

Richard Hartley and Andrew Zisserman, "Multiple View Geometry in Computer Vision", Cambridge University Press, First published 2000, Reprinted (with corrections) 2001, pp. 70-73, 92-93 and 98-99.

Kenichi Kanatani, "Camera Calibration", Geometric Computation for Machine Vision, Oxford Engineering Science Series, vol. 37, 1993, pp. 56-63.

Bernhard P. Wrobel, "Minimum Solutions for Orientation", Calibration and Orientation of Cameras in Computer Vision, Springer Series in Infomation Sciences, vol. 34, 2001, pp. 28-33.

Fie-Yue Wang, et al., "Stereo camera calibration without absolute world coordinate information", SPIE, vol. 2620, pp. 655-662, Jun. 14, 1995.

European Search Report for EP 04 25 1392 for a search that was completed on Jan. 11, 2007.

European Search Report for EP 06 01 9269 for a search that was completed on Nov. 9, 2006.

European Search Report for EP 06 01 9268 for a search that was completed on Nov. 9, 2006.

European Search Report for EP 02 25 3594 for a search that was completed on Dec. 14, 2005.

Jul. 5, 2010 Office Action, with English translation, for Japanese Patent Application No. 2005-000268 (6 pages).

Villamor et al. "Touch Gesture Reference Guide", Apr. 15, 2010.

International Search Report for PCT/CA2008/001350 mailed Oct. 17, 2008 (5 Pages).

International Search Report and Written Opinion for PCT/CA2007/002184 mailed Mar. 13, 2008 (13 Pages).

International Search Report and Written Opinion for PCT/CA2004/001759 mailed Feb. 21, 2005 (7 Pages).

International Search Report and Written Opinion for PCT/CA2009/000773 mailed Aug. 12, 2009 (11 Pages).

European Search Opinion for EP 07 25 0888 dated Jun. 22, 2007 (2 pages).

European Search Report for EP 07 25 0888 dated Jun. 22, 20067 (2 pages).

May 12, 2009 Office Action for Canadian Patent Application No. 2,412,878 (4 pages).

Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.

Press Release, "IntuiLab introduces IntuiFace, An interactive table and its application platform" Nov. 30, 2007.

Overview page for IntuiFace by IntuiLab, Copyright 2008.

NASA Small Business Innovation Research Program: Composite List of Projects 1983-1989, Aug. 1990.

*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).

International Preliminary Report on Patentability, PCT/NZ2004/000029, May 20, 2005 (21 pages).

"International Preliminary Report on Patentability", PCT/US2008/060102, Oct. 22, 2009 (9 pages).

International Search Report for PCT/CA2010/001085 mailed Oct. 12, 2010 (5 pages).

"International Application Serial No. PCT/US2008/060102, Search Report & Written opinion mailed Feb. 12, 2009" (14 pages).

International Application Serial No. PCT/US2008/074749, Search Report & Written Opinion mailed Feb. 11, 2009 (10 pages).

"International Application Serial No. PCT/US2008/074755, International Search Report and Written Opinion mailed Jan. 29, 2009" (14 pages).

International Search Report for PCT/NZ05/00092 Sep. 27, 2006 (4 pages).

Loinaz et al., "A 200-mW, 3.3-V, CMOS Color Camera IC Producing 352x288 24-B Video at 30 Frames/s," IEEE Journal of Solid-StateCircuits,vol. 31,No. 12,Dec. 1998, pp. 2092-2103.

Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).

*Touch Panel*, vol. 5 No. 2-3 (Sep. 2010).

*Touch Panel*, vol. 5 No. 4 (Nov. 2010).

"Store Window Presentations", Heddier Electronic.

"ThruGlass", Projected Capacitive Touchscreencs Specifications, Micro Touch.

Benko, et al., "Precise Selection Techniques for Multi-Touch Screens", Proc. ACM CHI 2006: Human Factors in Computer Systems, pp. 1263-1272.

Buxton, W., "Issues and Techniques in Touch-Sensitive Tablet Input," Computer Graphics, 19(3), Proceedings of SIGGRAPH '85, 1985, pp. 215-223.

VGA-format CMOS Camera-on-a-Chip for Multimedia Applications, Photobit Corporation, 1999 (2 pages).

"White Paper", Digital Vision Touch Technology, Feb. 2003.

\* cited by examiner

FIGURE ABOVE INDICATING THE ERROR FOR A TWO PANEL TILE

FIG. 7a

THIS FIGURE DEPICTS TWO TILES, BUT WITH AN ABSOLUTE ERROR

FIG 7b

NOTE HOW THE ERROR CATCHES UP AND THEN GROW TO THE NEXT GAP.

FIG 8a

WITH AN EVEN NUMBER OF DISPLAYS, A GAP IS IN THE MIDDLE.

WITH AN ODD NUMBER OF PANELS, A DISPLAY IS IN THE MIDDLE.

FIG. 9b

NUMBER OF DISPLAYS
IF THE GAP BETWEEN THE DISPLAYS WAS 1/2"
THEN
THE MAXIMUM ERROR WOULD HAVE BEEN 1/2"

TILED TOUCH SYSTEM

FIELD OF THE INVENTION

The present invention relates generally to interactive displays and in particular to a tiled touch system.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the contact surface where the contacts are made. There are basically two general types of touch systems available and they can be broadly classified as "active" touch systems and "passive" touch systems.

Active touch systems allow a user to generate user input by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate user input by contacting the touch surface with a passive pointer and do not require the use of a special pointer in order to activate the touch surface. A passive pointer can be a finger, a cylinder of some material, or any suitable object that can be used to contact some predetermined area of interest on the touch surface.

Passive touch systems provide advantages over active touch systems in that any suitable pointing device, including a user's finger, can be used as a pointer to contact the touch surface. As a result, user input can easily be generated. Also, since special active pointers are not necessary in passive touch systems, battery power levels and/or pointer damage, theft, or misplacement are of no concern to users.

International PCT Application No. PCT/CA01/00980 filed on Jul. 5, 2001 and published under No. WO 02/03316 on Jan. 10, 2002, assigned to SMART Technologies Inc., assignee of the present invention, discloses a camera-based touch system comprising a touch screen that includes a passive touch surface overlying a display unit such as for example a plasma display on which a computer-generated image is presented. A rectangular bezel or frame surrounds the touch surface and supports digital cameras at its corners. The digital cameras have overlapping fields of view that encompass and look across the touch surface. The digital cameras acquire images looking across the touch surface from different locations and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or drawing or used to control execution of application programs executed by the computer.

Although this touch system works extremely well, the use of a single, large display unit to present the computer-generated image has its disadvantages. Large high-resolution display units such as plasma displays are expensive and their resolutions are limited. Although large, lower cost display units are available, there is an associated reduction in resolution.

Large display units composed of arrays of smaller high-resolution display units have been considered. However, to-date the ability for users to interact with these large display units has been limited. Accordingly, there is a need for a low-cost, high resolution large-scale touch system.

It is therefore an object of the present invention to provide a novel tiled touch system.

SUMMARY OF THE INVENTION

Accordingly, in one aspect of the present invention there is provided a tiled touch system comprising:
 a display on which a computer-generated image is presented, said image being formed of an array of image segments; and
 a digitizer mapped to said display and sensing pointer contacts made thereon.

In one embodiment each image segment is mapped to a corresponding segment of the active area of the digitizer. At least one processing unit is responsive to the digitizer and updates the computer-generated image in response to sensed contacts on the display surface.

In one embodiment, the image segments form portions of a generally continuous image presented over the display. In another embodiment, the image segments are discrete.

In one embodiment, the display is constituted by an array of display panels, each of which presents one of the image segments. The display panels are of high resolution such as for example liquid crystal displays. In another embodiment, each image segment is projected on to an associated portion of the display by a projector. Adjacent projected image segments overlap.

The present invention provides advantages in that by using an array of small display panels to form a large tiled touch system, a larger interactive touch system with better resolution that is less expensive than currently available high resolution touch systems can be created. Also, by orienting the tiled touch system to map the coordinate systems of the display panels to the coordinate system of the digitizer allows the gaps between the display panels to be accommodated so that they do not disrupt the operation of the tiled touch system.

BRIEF DESCRIPTION OF DRAWINGS

Embodiments of the present invention will now be described more fully with reference to the accompanying drawings in which.

DETAILED DESCRIPTION OF EMBODIMENTS

Figure 1:
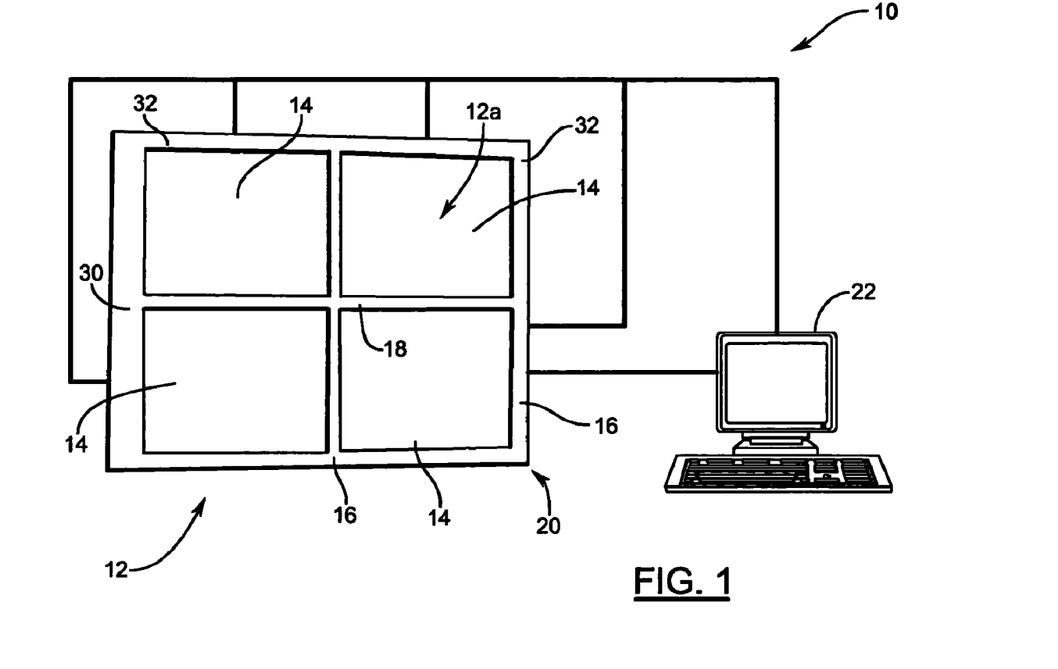
FIG. 1 is a schematic view of a tiled touch system in accordance with the present invention including a display unit constituted by an array of display panels and a digitizer overlying the display unit.
Figure 2:
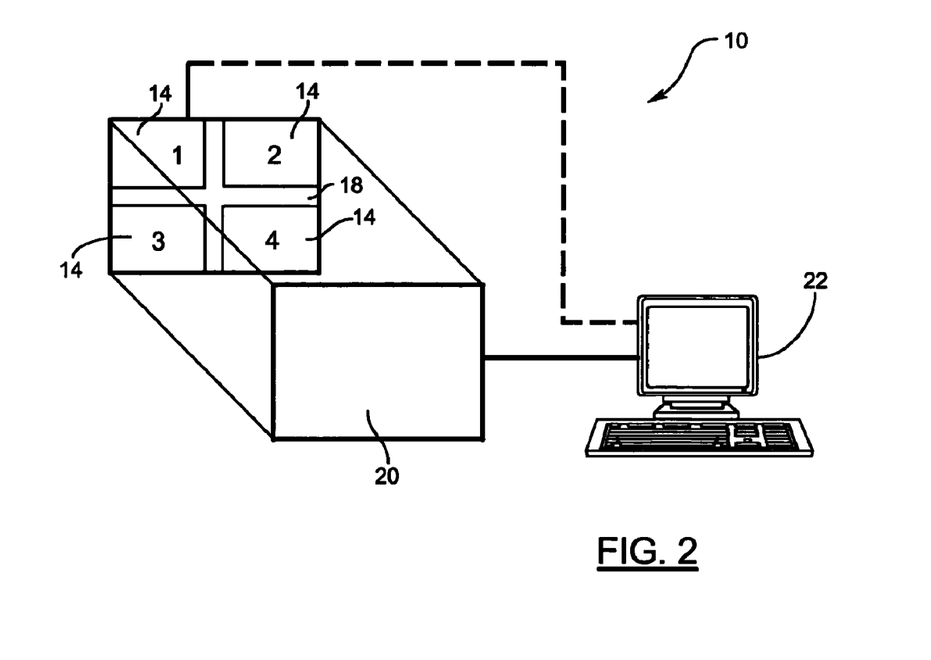
FIG. 2 is another schematic view of the tiled touch system of FIG. 1.

Turning now to FIGS. 1 and 2, a tiled touch system in accordance with the present invention is shown and is generally identified by reference numeral 10. As can be seen, tiled touch system 10 includes a display unit 12 constituted by an array of display panels or tiles 14, on which a computer-generated image is presented. In this embodiment, the display panels 14 are liquid crystal displays (LCDs) that are arranged to form a 2×2 array. Each LCD 14 has a 1280×1024 active display pixel array. The borders 16 of the LCDs 14 interrupt the overall display area 12a of the display unit 12. As a result, the display area 12a of the display unit 12 is made up of a L non-uniformly spaced linear matrix of display pixels. In this case, since an array of four LCDs 14 make up the display unit 12, the borders 16 of the LCDs form a t-shaped gap 18 that interrupts the display area 12a of the display unit 12.

Tiled touch system 10 also includes a digitizer 20 for detecting pointer contacts relative to the display area 12a of the display unit 12. Digitizer 20 is coupled to a computer 22 that executes one or more application programs and that provides display data to the LCDs 14 via a multi-head video card such as that manufactured by Matrox under Model No. G200. The computer 22 uses pointer coordinate data generated by the digitizer 20 to update the display data conveyed to the LCDs 14 via the video card and hence, to update the computer-generated image that is presented over the display area 12a of the display unit 12.

Digitizer 20 in this embodiment is of the type disclosed in U.S. patent application Ser. No. 10/312,938 filed on Jan. 3, 2003 to Morrison et al. and U.S. patent application Ser. No. 10/354,168 filed on Jan. 30, 2003 to Akitt et al., both assigned to SMART Technologies Inc., assignee of the present invention, the contents of which are incorporated herein by reference. Digitizer 20 includes a rectangular bezel 30 that surrounds the display unit 12 and supports digital cameras 32 at its corners. The digital cameras 32 have overlapping fields of view that encompass and look generally across the plane of the display unit 12. The digital cameras 32 acquire images looking across the display unit 12 from different locations and generate image data. A transparent pane (not shown) formed of resistant material, such as for example glass, overlies the display unit 12 to provide a smooth continuous contact surface for the digitizer 20.

The active display pixel array of each LCD 14 is individually mapped to a corresponding generally rectangular segment of the digitizer's active area during an orientation procedure as will be described. As a result, the portions of the digitizer's active area associated with the active display pixel arrays of the LCDs 14 are known as are the portions of the digitizer's active area associated with the non-active gaps 18.

Figures 4, 5:
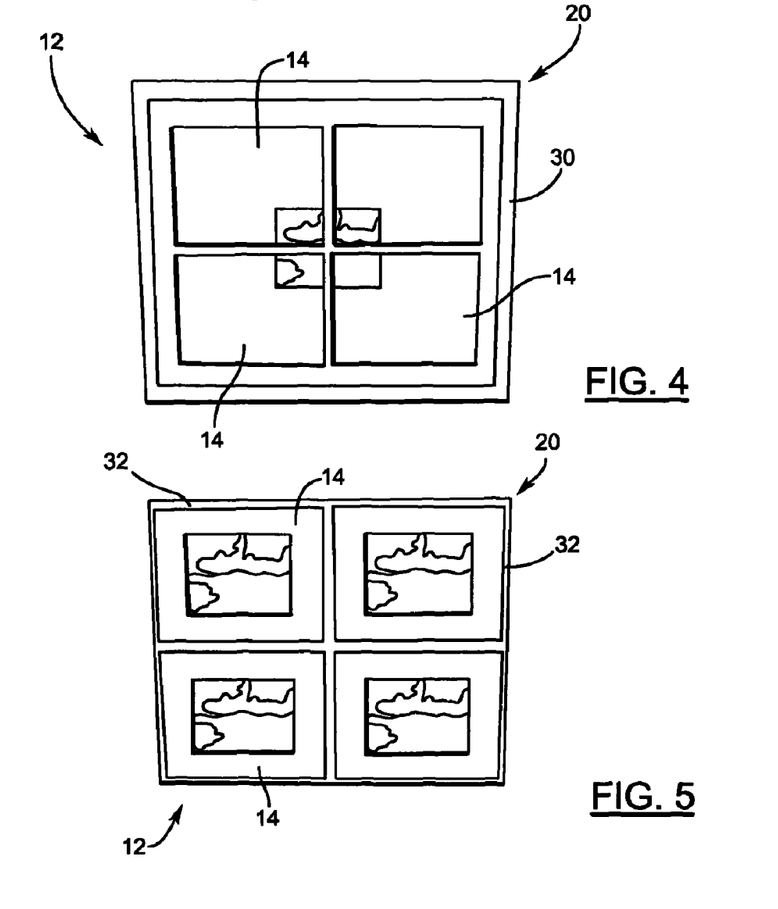
FIG. 4 is a front plan view of the display panels and digitizer with the display panels forming one large desktop.
FIG. 5 is a front plan view of the display panels and digitizer with each display panel forming an individual desktop.

In this embodiment, the computer 22 is configured to treat all of the LCDs 14 collectively as one large desktop. As a result, the computer 22 provides display data to the LCDs 14 causing the computer-generated image to be broken into segments with each segment being displayed by one of the LCDs 14 as shown in FIG. 4.

During operation, image data acquired by the digital cameras 32 is processed by digital signal processors (not shown) associated with the digital cameras 32 to determine if a pointer exists in the captured image data. When it is determined that a pointer exists in the captured image data, the digital signal processors convey pointer characteristic data to the computer 22, which in turn processes the pointer characteristic data to determine the location of the pointer in (x,y) coordinates relative to the display area 12a of the display unit 12 using triangulation. The computer 22 uses the pointer coordinate data to update the computer-generated image that is presented over the display area of the display unit 12. Thus, the display unit 12, digitizer 20 and computer 22 form a closed-loop making the tiled touch system 10 user interactive. Pointer contacts on the contact surface of the digitizer 20 can therefore be recorded as writing or drawing or used to control execution of application programs executed by the computer 22.

As mentioned above, the active display pixel array of each LCD 14 is mapped to a corresponding segment of the digitizer's active area. Thus, pointer contacts on the contact surface of the digitizer 20 over a particular LCD 14 that are specific to that particular LCD are processed by the computer 22 so that only the display data conveyed to that particular LCD is effected. Pointer contacts representing global display commands are of course processed by the computer 22 in a manner that effects the overall computer-generated image displayed over the display area 12a.

Mapping the active display pixel arrays of the LCDs 14 to the digitizer's active area establishes the non-active regions of the digitizer's active area corresponding to the gaps 18. Compensating for the gaps 18 allows the tiled touch system 10 to handle pointer contacts that fully traverse gaps as well as start and/or stop within gaps.

For example, when a pointer is used to touch the contact surface of the digitizer 20 and initiate a left-to-right horizontal drag operation from one LCD 14 to the adjacent right LCD, when the pointer reaches the gap between the LCDs 14, the cursor remains at the right most column of pixels of the left LCD but follows the pointer vertically along the right most column of pixels as the pointer travels across the gap. When the pointer reaches the mid-point of the gap, the cursor flips to the left most column of pixels of the right LCD and remains in that pixel column while the pointer is in the gap. The cursor however moves vertically along the left most column of pixels to track the pointer. When the pointer reaches the active pixel display array of the right LCD 14, the cursor resumes tracking the pointer along both horizontal and vertical axis as the pointer moves over the active display pixel array of the right LCD panel.

A similar process is performed if a vertical drag operation is performed, except that the cursor remains in a horizontal pixel row when the pointer is moving across the gap but moves horizontally along the pixel row to track the pointer.

When a mouse down or mouse up event occurs at a gap, the mouse event can be translated to the closest LCD 14. Alternatively, mouse down or mouse up events in the gaps can be interpreted as gestures causing an associated function to be performed. For example, a window drag event starting over one LCD that ends in a gap could initiate a centering function causing the dragged window to be centered on the display of the LCD 14. Alternatively, a drag event initiated from a right gap into the active display pixel array of an LCD 14 may initiate a right click event at the location where the drag event is ended.

If desired command icons associated with particular commands can be provided within the gaps. Contacts that start and end on the command icons cause the computer 22 to execute the associated commands. Contacts with command icons that originate from outside of the gaps are ignored.

As mentioned previously, in order to enable the tiled touch system 10 to work effectively, it is necessary to orient or calibrate the tiled touch system 10 by mapping the coordinate system of the digitizer 20 to the coordinate system of each LCD 14 and to accommodate for the gaps 18 caused by the borders 16 of the LCDs 14.

Figure 3:
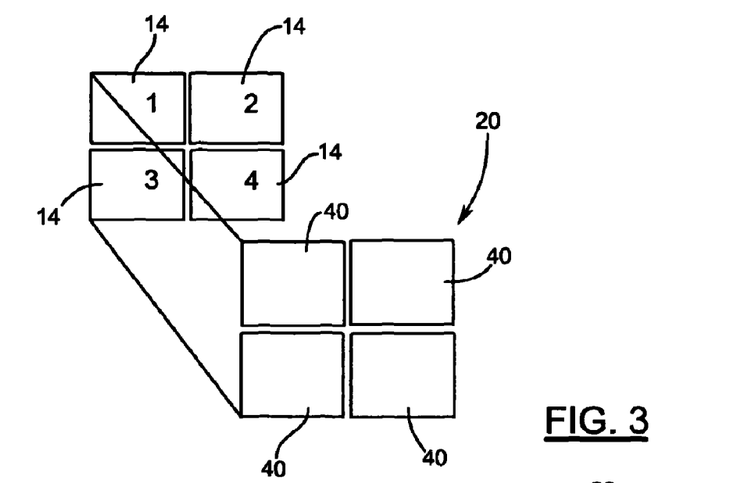
FIG. 3 is a perspective view showing mapping of the display panels to the digitizer.

During orientation, each LCD 14 is individually mapped to its corresponding rectangular segment 40 of the digitizer's active area as shown in FIG. 3. Thus, each segment 40 of the digitizer's active area generally overlies an associated LCD 14 with the (x,y) coordinates of each segment 40 being mapped to the (x,y) coordinates of its associated LCD 14 thereby to unify the display unit 12.

Figure 6:
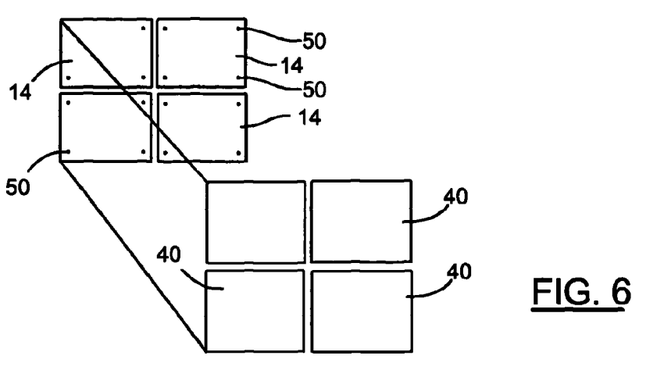
FIG. 6 is a perspective view showing orientation points displayed on the display panels during orientation of the tiled touch system to map the coordinate systems of the display panels to the coordinate system of the digitizer.

In order to achieve the desired mapping, the computer 22 drives each LCD 14 so that it presents a plurality of orientation points 50, in this example four (4) orientation points, at spaced locations as shown in FIG. 6. For each LCD 14, the user is prompted to touch the contact surface of the digitizer 20 at the displayed orientation points. As this is done, the digitizer 20 generates (x,y) pointer coordinate data corresponding to the locations where pointer contacts are made. Since the locations of the orientation points in the LCD coordinate system are known, the segments 40 of the digitizer 20 can be properly mapped to the coordinate system of the LCDs 14.

By displaying four orientation points 50 on each LCD 14 during orientation, the LCD and digitizer coordinate systems can be mapped to account for positional, scaling, rotation and non-linear aspects of the LCDs 14 such as keystone errors. If more than four orientation points are used, the mapping will take into account non-linear aspects of the digitizer 20.

With the LCD and digitizer coordinate systems mapped and with the number of LCDs 14 in the array known, the gaps between adjacent LCDs 14 are known and can be taken into account allowing the entire display surface 12*a* of the display unit 12 to be treated as a single display.

If desired, the number of orientation points 50 displayed by the LCDs 14 during orientation of the tiled touch system 10 can be varied. Increasing the number of orientation points increases mapping accuracy but requires the user to spend more time to orient the tiled touch system. Fewer orientation points reduces the types of display and digitizer errors that can be taken into account.

Alternatively, during orientation of the tiled touch system 10, dimensional information concerning the tiled touch system can be entered to allow the computer 22 to calculate the locations of the gaps. In this case, the user is prompted to enter the size of the LCD array, the diagonal dimension of the display unit 12 and the dimension of the gap-widths. With this information, the LCD and digitizer coordinate systems can be oriented by displaying only four points over the entire display area 12*a*. Although this allows the coordinate systems to be mapped using a limited number of orientation points, using so few orientation points reduces the types of display and digitizer errors that can be taken into account.

Figure 7A:
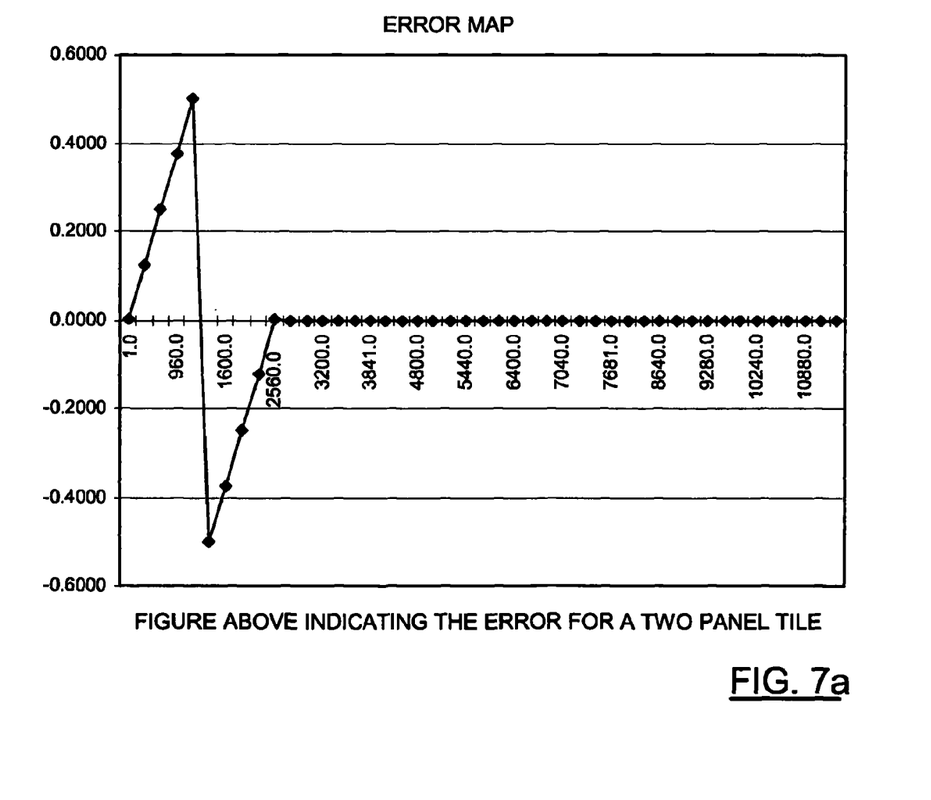
FIGS. 7a and 7b are graphs showing the orientations error associated with a prototype tiled touch system including two display panels.
Figure 7B:
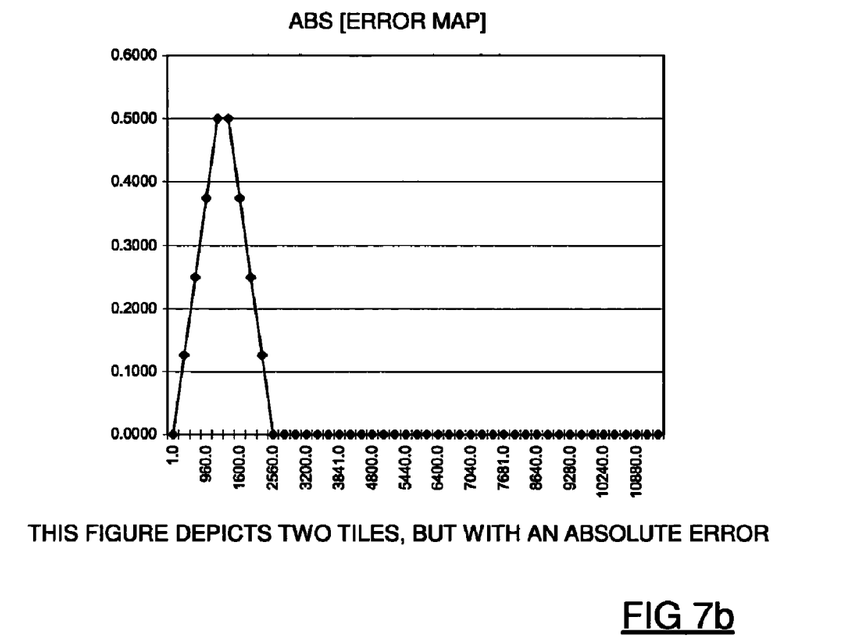

To assist in calibrating the tiled touch system 10, a prototype tiled touch system including two display panels was constructed. The two display panels were separated by a one-inch gap. A four point orientation procedure was carried out as described above but without correcting for the gap between the display panels. The prototype tiled touch system exhibited a ½ inch orientation error as a result of the gap between the display panels. FIGS. 7*a* and 7*b* are graphs showing the orientation error associated with the prototype tiled touch system as a pointer is moved horizontally across the tiled touch system.

Figure 8A:
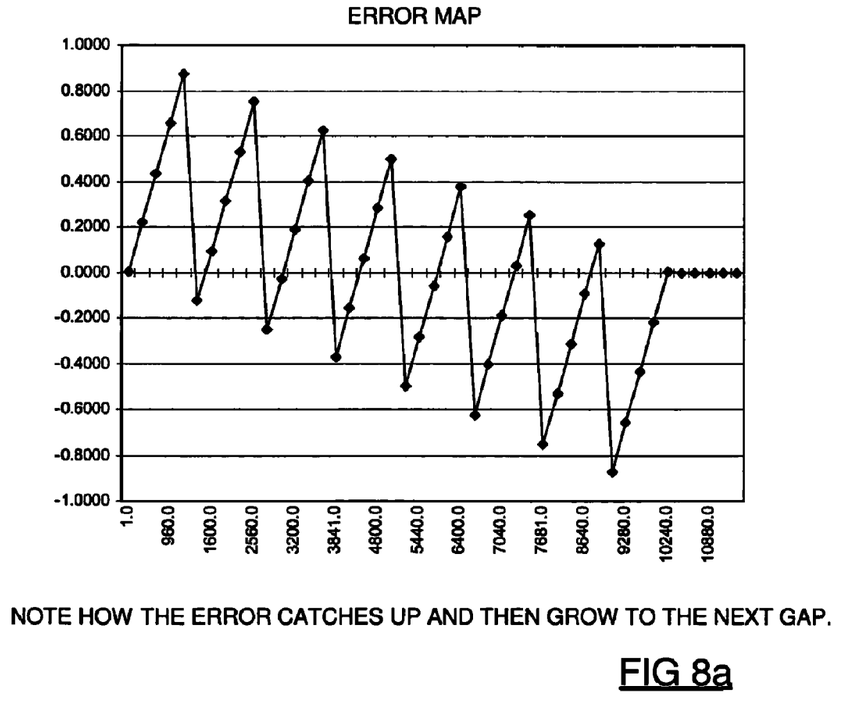
FIGS. 8a and 8b are graphs showing the orientation error associated with a modeled tiled touch system including an 8×1 array of display panels.
Figure 8B:
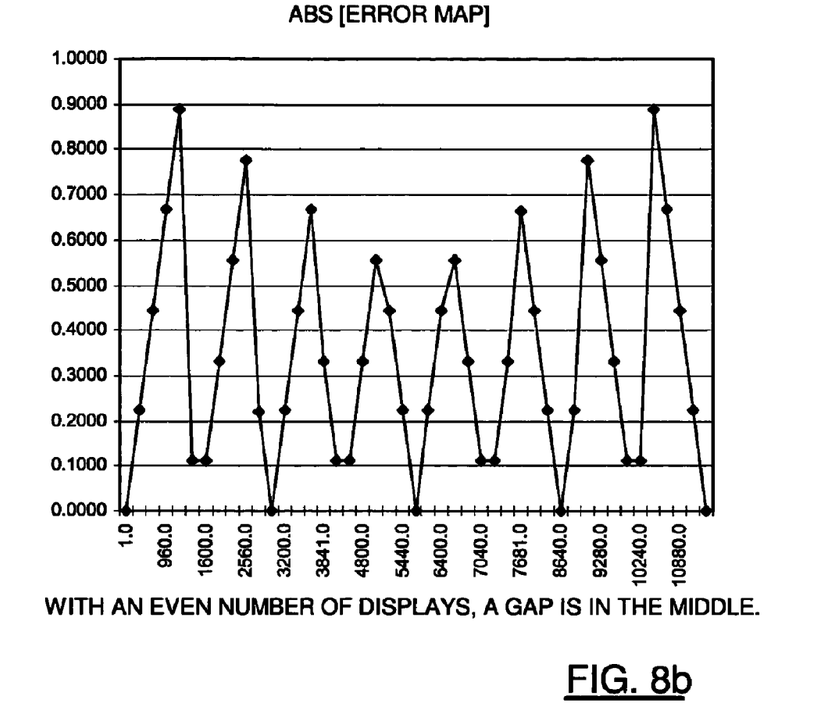
Figure 9A:
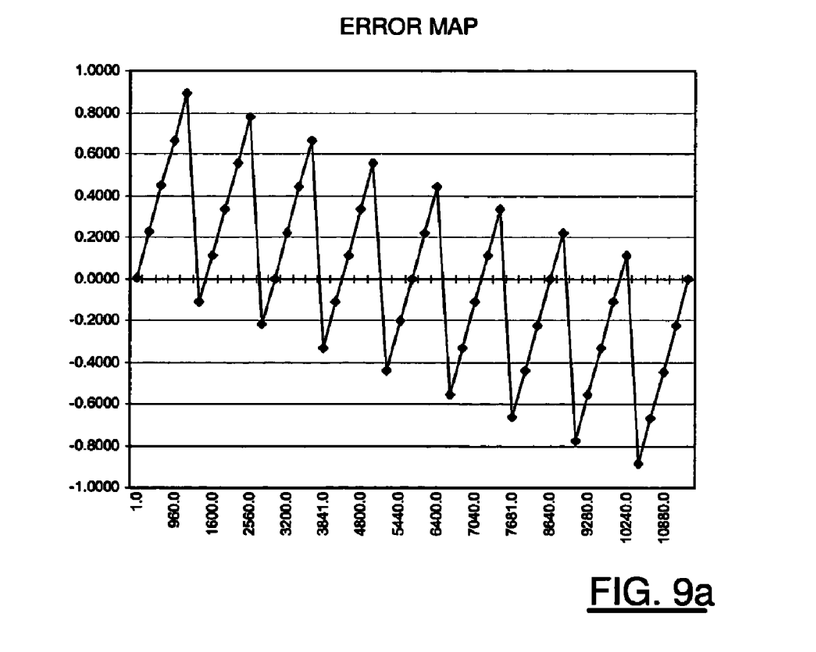
FIGS. 9a and 9b are graphs showing the orientation error associated with a modeled tiled touch system including a 9×2 array of display panels.
Figure 9B:
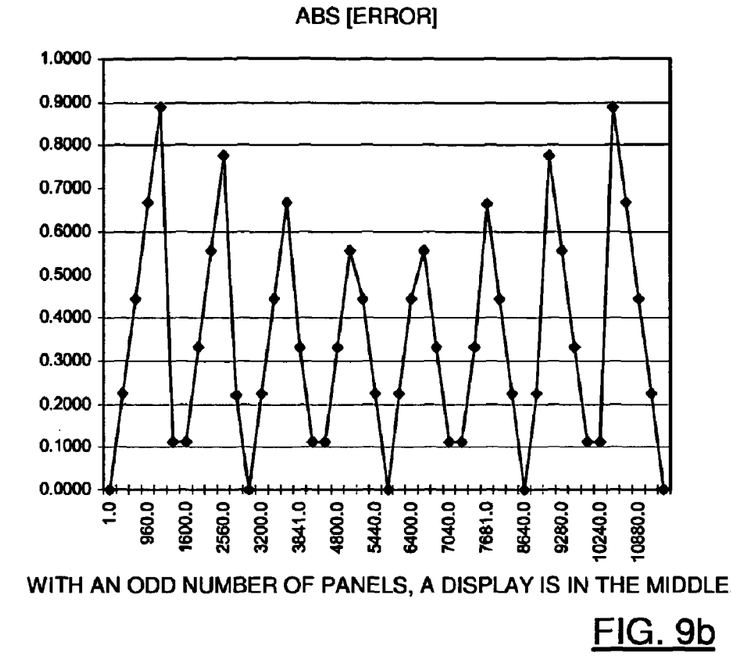

Building on this information, the orientation error associated with tiled touch systems was modeled. FIGS. 8*a* and 8*b* are graphs showing the orientation error associated with a modeled tiled touch system including an 8×1 array of display panels and FIGS. 9*a* and 9*b* are graphs showing the orientation error associated with a modeled tiled touch system including a 9×1 array of display panels. It can be seen that the first gap in these tiled touch systems creates the largest amount of orientation error. Error to one side of a touch point catches up when a gap is crossed resulting in the orientation error being distributed over the display unit, creating zones of alignment as the pointer moves across the display unit.

Figure 10:
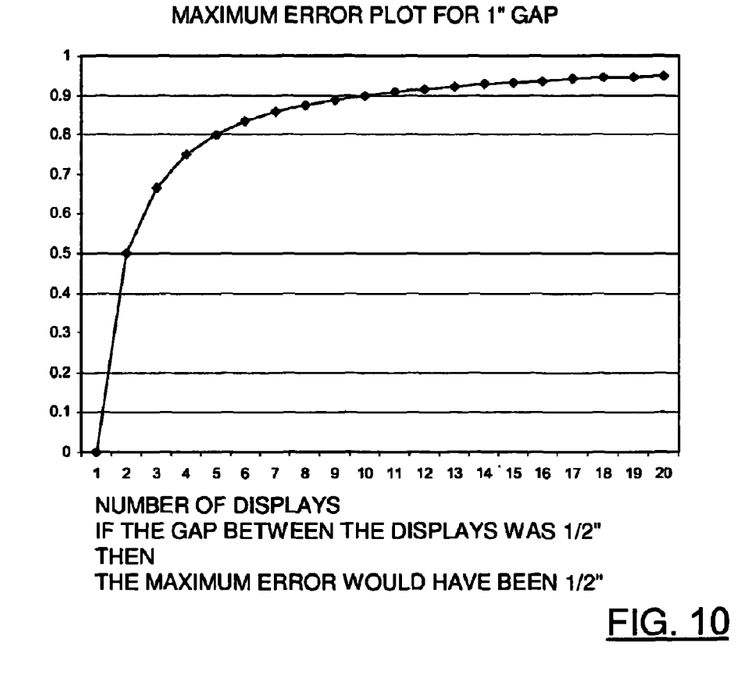
FIG. 10 is a graph showing the relationship between maximum orientation error and the number of display panels in the tiled touch system.

Of interest, the resolution of the display panels does not effect the orientation error nor does the size of the display panels. The maximum orientation error of a display unit including more than two display panels occurs at the first and last gaps. The gap width between the display panels represents the maximum orientation error that a tiled touch system having an infinite number of display panels would exhibit as represented in FIG. 10.

If desired, the computer 22 may be configured to treat each of the LCDs 14 as a separate monitor with each LCD 14 presenting its own complete computer-generated image. The computer-generated images displayed by the LCDs 14 may be the same as shown in FIG. 5 or may be different.

Those of skill in the art will appreciate that display units other than LCDs can be used to form the display unit 12. For example, plasma display panels, cathode ray tubes (CRTs), or front or rear projection display units arranged in the desired array can be used. Basically, any display unit or combination of display units that can be arranged in an array can be used. Creating a display unit having a generally flat display area provides advantages in that parallax is reduced, thereby creating a good touch environment for the digitizer 20.

Figure 11:
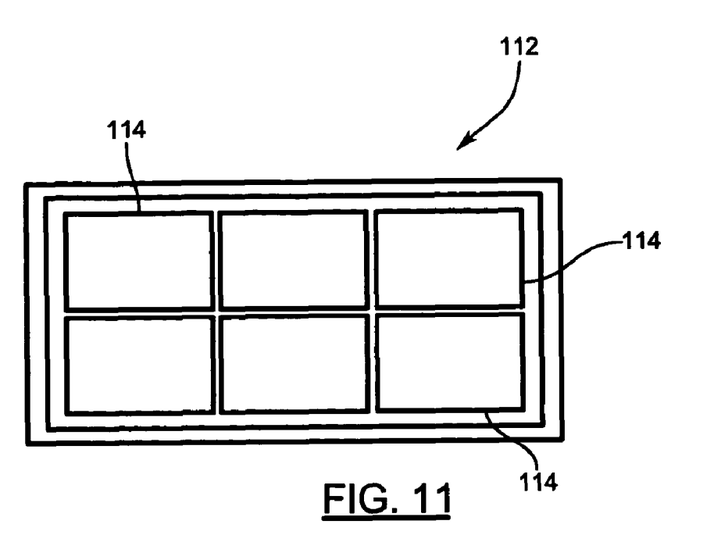
FIG. 11 is a front plan view of an alternative display unit.
Figure 12A:
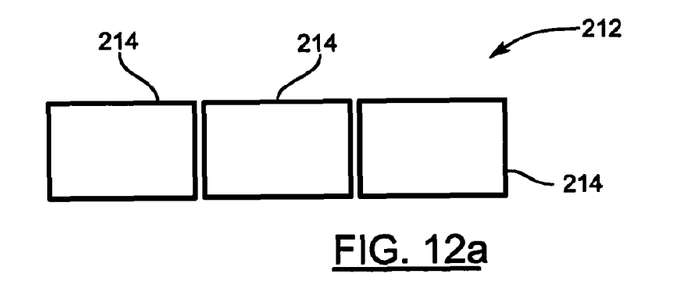
FIGS. 12a and 12b are front plan schematic views of further embodiments of display units.
Figure 12B:
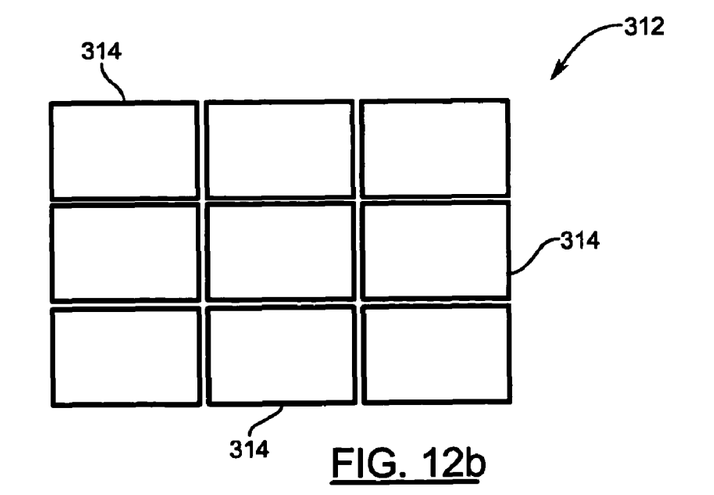

Although a particular architecture for the tiled touch system is illustrated in FIGS. 1 to 6, those of skill in the art will appreciate that alternatives are available. For example, the display unit 12 need not be limited to an array of four display panels. The display unit 12 may be made up of virtually any number of display panels. For example, FIG. 11 shows a display unit 112 constituted by a 2×3 array of display panels 114. FIG. 12*a* shows a display unit 212 constituted by a single row of three display panels 214 while FIG. 12*b* shows a display unit 312 constituted by a 3×3 array of display panels 314.

Figure 13:
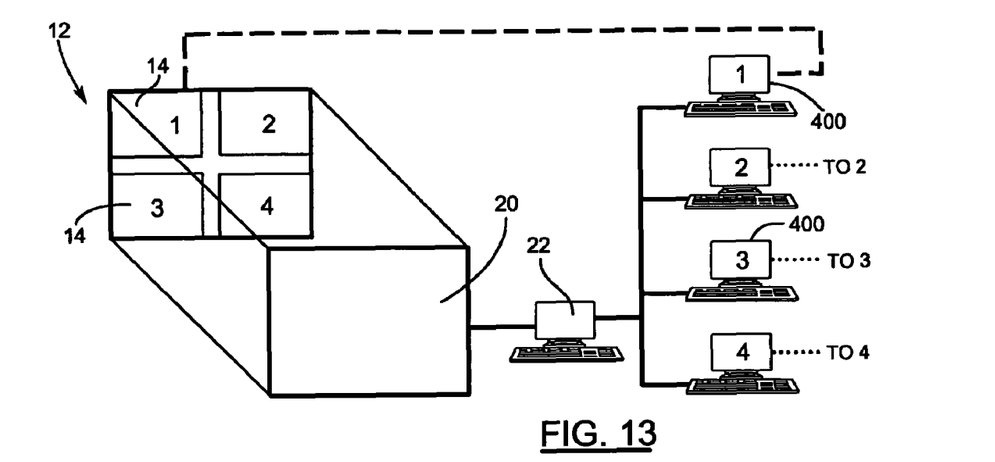
FIG. 13 is a schematic view of another embodiment of a tiled touch system in accordance with the present invention.

Rather than using a single computer 22 to drive the display panels and to determine pointer contacts on the display area 12*a* of the display unit 12 by triangulating the pointer characteristic data generated by the digitizer 20, the computer 22 can be used in conjunction with a number of other computers allowing responsibility for these tasks to be divided. Computer 22 in this case remains responsible for generating the pointer coordinate data in response to pointer contacts made on the display surface of the display unit 12, while computers are responsible for generating the display data conveyed to the display panels. Since separate computers are used to provide the display data to the display panels, in this environment, each display panel in the display unit acts as a separate monitor as shown in FIG. 5. For example, as shown in FIG. 13, separate computers 400 are used to drive each display panel 14. In this embodiment when a pointer contact is made on one of the display panels, the computer 22 provides pointer coordinate data to the computer 400 associated with that display panel so that the computer-generated image displayed by that display panel can be updated to reflect the pointer activity.

In this embodiment, the gaps are treated differently for contact events and drag events since a single computer does not control the display data conveyed to the display panels.

Figure 14:
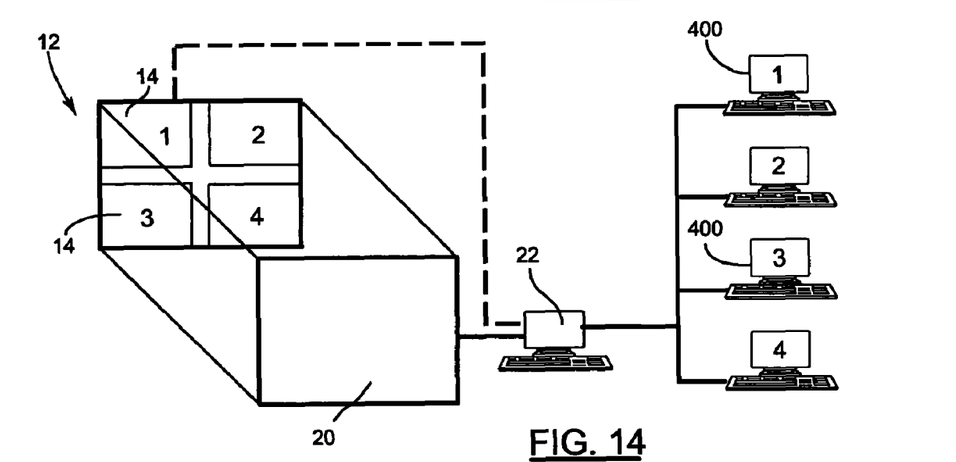
FIG. 14 is a schematic view of yet another embodiment of a tiled touch system in accordance with the present invention.

Alternatively, as shown in FIG. 14, the separate computers 400 provide the display data to the computer 22, which in turn conveys the display data to the display panels 14. When a pointer contact is made on one of the display panels, the computer 22 provides pointer coordinate data to the computer associated with that display panel as well as contact information to the other computers so that contact and drag events occurring in the gaps can be accounted for. The computer in turn updates the display data and conveys the updated display data back to the computer 22. The computer 22 in turn modifies the received display data based on contact events received from the other computers and forwards the display data to the display panel so that the computer-generated image displayed by the display panel can be updated to reflect the pointer activity.

Figure 15A:
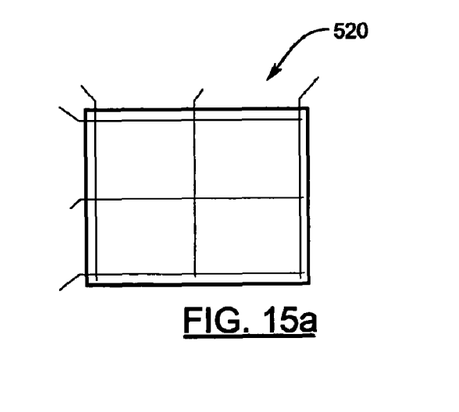
FIGS. 15a and 15b are front plan views of alternative digitizers.
Figure 15B:
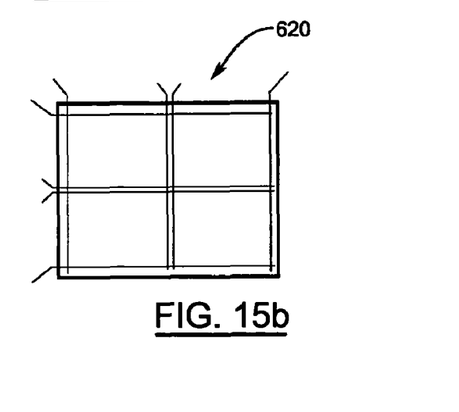

Alternative digitizers can also be used in the tiled touch system provided the digitizer's active area can be partitioned into segments corresponding generally with the display panels 14 making up the display unit 12. For example as shown in FIGS. 15a and 15b, analog resistance touch screens 520 and 620 can be disposed over the display unit. In this case, the electrodes of the analog resistive touch screens are configured to allow the active area of the touch screens to be partitioned into the appropriate segments.

The tiled touch system provides a high resolution interactive display unit having a number of applications that take advantage of the fact that the display unit is made up of a plurality of display panels. For example, in real estate applications, one display panel can be used to present high level details of houses for sale, another display panel can be used to present specific details concerning a selected house and the remaining display panels can be used to display images of rooms within the selected house.

In movie theatre applications, one display panel can be used to present a graphical user interface that allows a user to browse through the theatre and buy movie tickets, another display panel can be used to present current and upcoming movies and the remaining display panels can be used to present movie trailers.

In home improvement applications, one display panel can be used to present a list of do-it-yourself projects, another display panel can be used to present a selected do-it-yourself project, other display panels can present steps required for the selected project and remaining display panels can present advertising relating to tools and accessories required for the selected project.

The orientation procedure described above is also suitable for use in touch systems where multiple projectors are used to project discrete images on a common display surface that overlap to form a continuous image over the entire display surface. Since each image is projected by its own projector, each projector may produce a differently distorted image. By allowing each projected image to be calibrated relative to its associated segment of the digitizer, a low cost, high resolution projection touch system can be created using multiple low cost projectors. Also, in rear projection systems, since the projectors are only responsible for projecting images on to a portion of the display surface, the throw distances of the projectors are smaller allowing the housing thickness to be reduced.

Although embodiments of the present invention have been described, those of skill in the art will appreciate that variations and modification may be made without departing from the spirit and scope thereof as defined by the appended claims.

What is claimed is:

1. A tiled touch system comprising:
a display on which a computer-generated image is presented, said display comprising an array of display panels, each display panel having an active display area on which a segment of said computer-generated image is presented, the display areas of adjacent display panels being interrupted by physical gaps, said gaps defining non-active display regions;
at least one digitizer disposed on said display and providing a generally continuous contact surface overlying the active display areas and the non-active display regions corresponding to said gaps, said at least one digitizer being mapped to both said active display areas and said non-active display regions, said at least one digitizer comprising at least two imaging devices looking generally across said contact surface from different vantages and acquiring image frames to detect pointer contacts made on said contact surface over active display areas and on said contact surface over non-active display regions; and
at least one processing unit responsive to pointer data received from said at least one digitizer and updating said computer-generated image in response to detected pointer contacts on said contact surface, wherein mapping of said at least one digitizer to both said active display areas and said non-active display regions is performed during an orientation procedure, and wherein during said orientation procedure, said at least one processing unit updates the computer-generated image so that each display panel displays a plurality of orientation points.

2. A tiled touch system according to claim 1 wherein said image segments form portions of a generally continuous image presented over said display.

3. A tiled touch system according to claim 1 wherein said image segments are discrete.

4. A tiled touch system according to claim 1 wherein each display panel is a high resolution display panel.

5. A tiled touch system according to claim 1 wherein each image segment is projected onto the active display area of an associated display panel.

6. A tiled system according to claim 1 wherein said at least one processing unit processes received pointer data to recognize pointer contacts on the contact surface starting and/or stopping at locations that are mapped to the non-active display regions corresponding to the gaps as input commands.

7. A tiled touch system according to claim 1 wherein said at least one processing unit recognizes pointer contacts on said contact surface beginning and/or ending at locations that are mapped to the non-active display regions corresponding to said gaps as input command events.

8. A tiled touch system according to claim 1 further comprising selectable icons at locations that are mapped to the non-active display regions corresponding to said gaps.

9. A tiled touch system according to claim 1 wherein said at least one digitizer comprises a generally transparent, rigid pane overlying said display and having an upper surface defining said contact surface.

10. A tiled touch system according to claim 1 wherein said at least one processing unit tracks pointer movements along said contact surface traversing the non-active display regions corresponding to the gaps.

11. A tiled touch system according to claim 1 wherein each display panel displays at least four orientation points.

12. A tiled touch system according to claim 4 wherein said display panels are liquid crystal displays.

13. A tiled touch system according to claim 5 wherein said computer-generated image is formed of overlapping image segments.

14. A tiled touch system according to claim 13 wherein each display panel is a high resolution display panel.

15. A tiled touch system according to claim 6 wherein each display panel is a high resolution display panel.

16. A tiled touch system according to claim 14 wherein said display panels are liquid crystal displays.

17. A tiled touch system according to claim 14 wherein said at least one digitizer comprises a generally transparent, rigid pane overlying said display and having an upper surface defining said contact surface.

18. A tiled touch system according to claim 15 wherein said display panels are liquid crystal displays.

19. A tiled touch system comprising:
a display comprising a plurality of display panels, each of said display panels comprising a matrix of display pixels defining an active display area and a border surrounding said display area thereby to interrupt said display and define non-active display regions, each display area presenting a portion of an image;
a digitizer comprising a continuous, generally transparent rigid pane on said display and defining a contact surface overlying both said active display areas and said non-active display regions, the contact surface of said transparent pane being mapped to said active display areas and said non-active display regions, said digitizer further comprising at least two imaging devices looking generally across said contact surface and capturing image frames from different vantages; and
at least one processing unit responsive to pointer data output by said digitizer and updating the image presented by said display in response to detected pointer contacts on said contact surface, contacts on said contact surface initiating at locations that are mapped to non-active display areas corresponding to the borders being recognized by said at least one processing unit as input command events, wherein the contact surface of the transparent pane is mapped to the active display areas and the non-active display regions during an orientation procedure, said mapping compensating for at least some of positional, scaling, rotation and keystone errors, and wherein during said orientation procedure, said at least one processing unit updates the computer-generated image so that each display panel displays a plurality of orientation points.

20. A tiled touch system according to claim 19 wherein said at least one processing unit further tracks pointer movements along said contact surface traversing borders between adjacent display panels.

21. A tiled touch system according to claim 19 wherein said at least one processing unit is at least one computer coupled to said display.

22. A tiled touch system according to claim 19 further comprising selectable icons at locations that are mapped to the non-active display corresponding to said borders.

23. A tiled touch system according to claim 19 wherein each display panel displays at least four orientation points.

24. A tiled touch system according to claim 20 wherein each display panel is a high resolution display panel.

25. A tiled touch system according to claim 20 wherein said at least one processing unit is at least one computer coupled to said display.

26. A tiled touch system according to claim 24 wherein said display panels are liquid crystal displays.

27. A tiled touch system according to claim 21 wherein said at least one computer is a single computer coupled to said display.

28. A tiled touch system according to claim 21 wherein said at least one computer is a plurality of computers coupled to said display, each computer being associated with a respective one of said display panels, each display panel presenting a different portion of said image in response to image data received from said associated computer.

29. A tiled touch system according to claim 25 wherein said at least one computer tracks pointer movements along said contact surface traversing borders between adjacent display panels.

30. A tiled touch system according to claim 29 wherein said at least one computer is a single computer coupled to said display.

31. A tiled touch system according to claim 29 wherein said at least one computer is a plurality of computers coupled to said display, each computer being associated with a respective one of said display panels, each display panel presenting a different portion of said image in response to image data received from said associated computer.

32. A tiled touch system according to claim 7 wherein said at least one processing unit executes an associated function in response each recognized input command event.

33. A tiled touch system according to claim 8 wherein said at least one processing unit executes an associated function in response to selection of one of said selectable icons.

34. A tiled touch system according to claim 22 wherein said at least one processing unit executes an associated function in response to selection of one of said selectable icons.

35. A tiled touch surface according to claim 9 wherein said pane is formed of glass.

36. A tiled touch surface according to claim 17 wherein said pane is formed of glass.

37. A tiled touch system comprising:
a display on which a computer-generated image is presented, said display comprising an array of display panels, each display panel having an active display area on which a segment of said computer-generated image is presented, the display areas of adjacent display panels being physically separated by gaps, said gaps defining non-active display regions;
a digitizer disposed on said display and providing a generally continuous contact surface overlying both said active display areas and said non-active display regions corresponding to said gaps, the contact surface being mapped to both said active display areas and said non-active display regions, said digitizer comprising at least two imaging devices looking generally across said contact surface from different vantages and acquiring image frames to detect pointer contacts made on said contact surface over active display areas and on said contact surface over non-active display regions, said digitizer tracking pointer movements on and across the non-active display regions between adjacent display panels; and at least one processing unit responsive to pointer data received from said digitizer and updating said computer-generated image in response to detected pointer contacts on said contact surface, wherein mapping of said contact surface to both said active display areas and non-active display regions corresponding to said gaps is performed during an orientation procedure, and wherein during said orientation procedure, said at least one processing unit updates the computer-generated image so that each display panel displays a plurality of orientation points.

38. A tiled touch system according to claim 37 wherein said image segments form portions of a generally continuous image presented on said display.

39. A tiled touch system according to claim 37 wherein each display panel is a high resolution display panel.

40. A tiled touch system according to claim 37 wherein said at least one processing unit tracks pointer movements along said contact surface traversing the non-active display regions corresponding to the gaps.

41. A tiled touch system according to claim 37 wherein said at least one processing unit recognizes pointer contacts on said contact surface beginning and/or ending at locations that are mapped to the non-active display regions corresponding to gaps as input command events.

42. A tiled touch system according to claim 37 further comprising selectable icons at locations that are mapped to the non-active display regions corresponding to the gaps.

43. A tiled touch system according to claim 37 wherein said digitizer comprises a generally transparent, rigid pane overlying said display and having an upper surface defining said contact surface.

44. A tiled touch system according to claim 37 wherein each display panel displays at least four orientation points.

45. A tiled touch system according to claim 39 wherein said display panels are liquid crystal displays.

46. A tiled touch system according to claim 40 wherein said at least one processing unit detects pointer contacts on said contact surface starting and/or stopping at locations that are mapped to the non-active display regions corresponding to the gaps as input command events.

47. A tiled touch system according to claim 41 wherein said at least one processing unit executes an associated function in response each recognized input command event.

48. A tiled touch system according to claim 42 wherein said at least one processing unit executes an associated function in response to selection of one of said selectable icons.

49. A tiled touch system according to claim 10 further comprising selectable icons at locations that are mapped to the non-active display regions corresponding to the gaps.

\* \* \* \* \*